April 12, 1949.  K. E. COOK  2,466,791
VEHICLE CONSTRUCTION
Filed Aug. 4, 1944  2 Sheets-Sheet 1
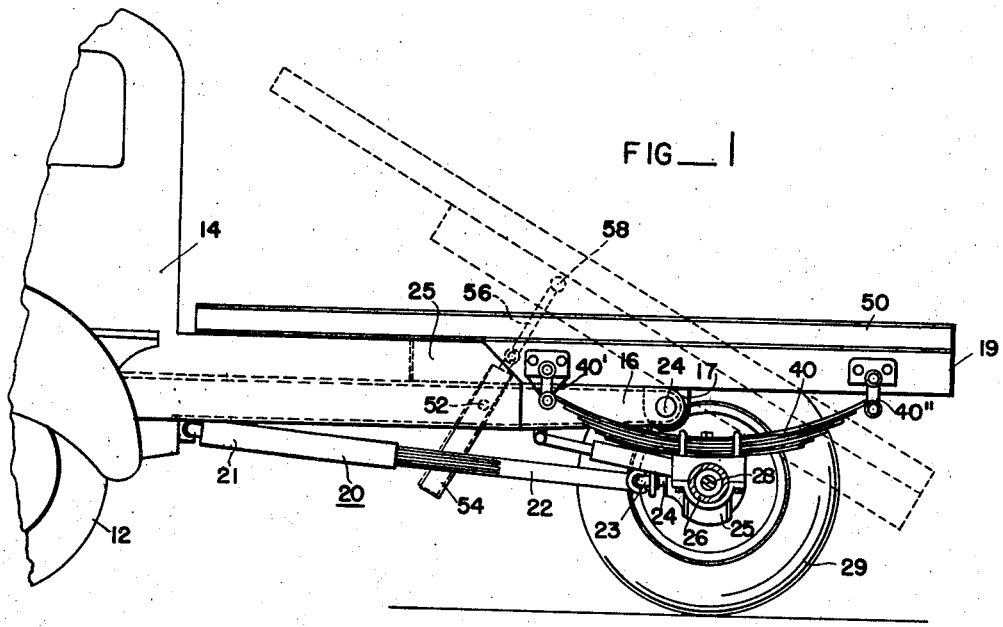
FIG_1
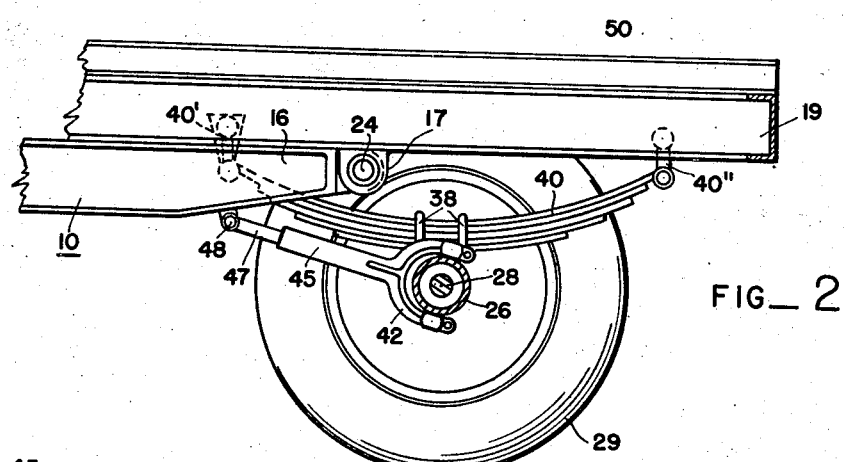
FIG_2
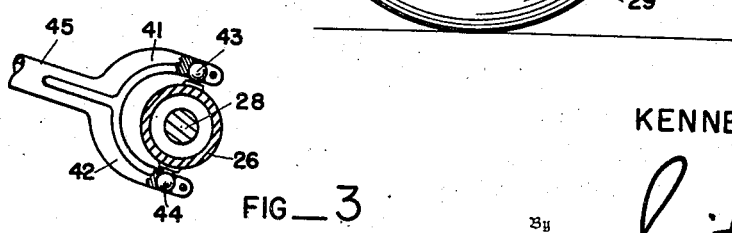
FIG_3
KENNETH E. COOK
Inventor
By *Smith & Tuck*
Attorney April 12, 1949.　　　　　K. E. COOK　　　　　2,466,791
VEHICLE CONSTRUCTION
Filed Aug. 4, 1944　　　　　　　　　　　　2 Sheets-Sheet 2
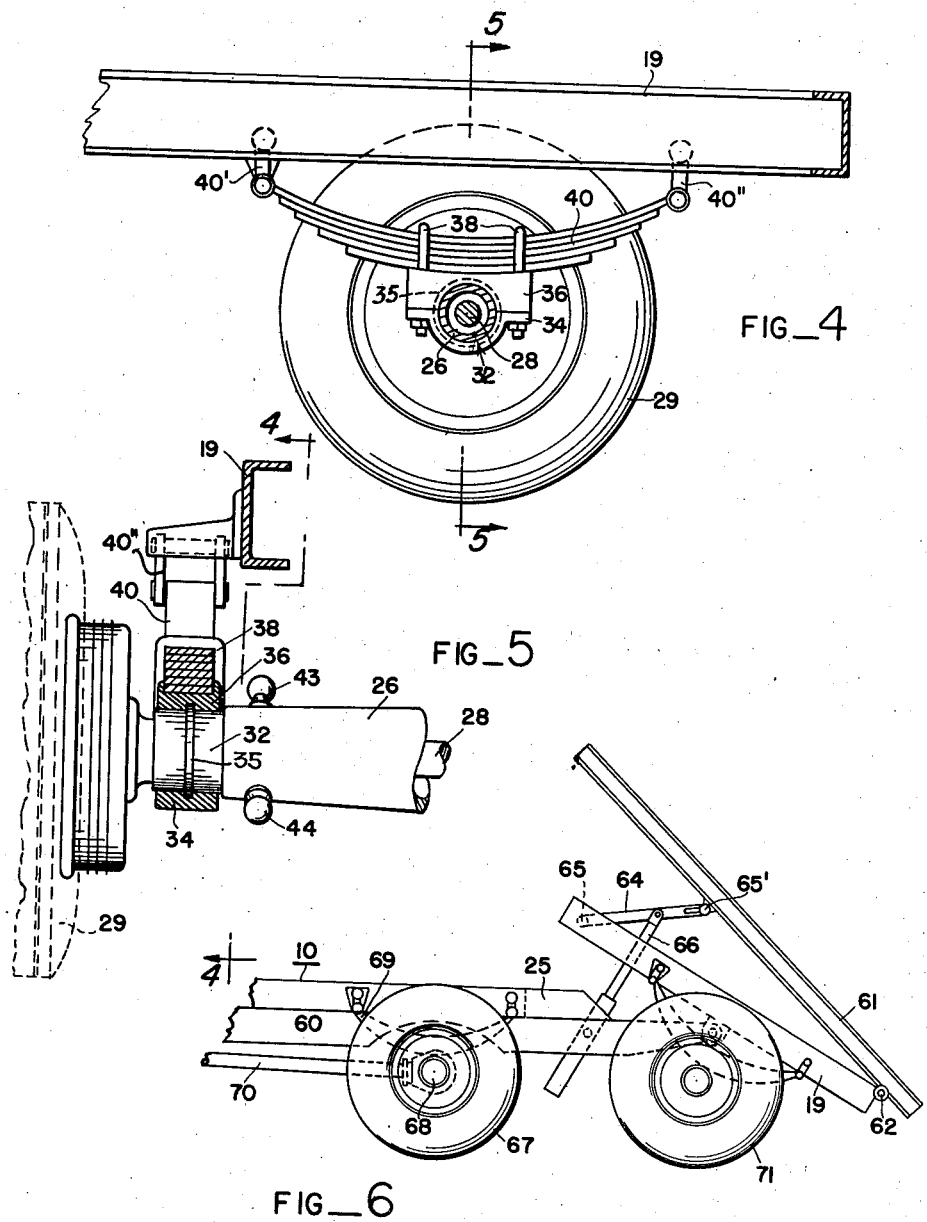
KENNETH E. COOK
Inventor
By Smith & Tuck
Attorney Patented Apr. 12, 1949

2,466,791

UNITED STATES PATENT OFFICE 2,466,791

VEHICLE CONSTRUCTION

Kenneth E. Cook, Seattle, Wash.

Application August 4, 1944, Serial No. 548,026

3 Claims. (Cl. 298—17)

This invention relates to improvements in vehicle construction of the transport type, and, more particularly, relates to motorized dump trucks and trailers of the self-unloading type.

Prime criticisms of the prior art dump truck constructions are that they have been extremely complicated, have been unduly high because of the superpositioning of the truck body upon the main frame of the vehicle, and have required excessive power in order to raise them to the dumping position under a load because the load must be lifted bodily without fully employing the mechanical advantages available to assist such an operation.

Having in mind the defects of the prior art, one of the primary objects of the present invention is to provide, in a motor transport vehicle, an improved tilting frame assembly of simple construction and requiring less power to operate than has been previously possible in conventional dump trucks.

Another object of the invention is to provide, in a vehicle construction, a tilting frame that is supported at its rear by the wheels and is connected to a wheelless main frame without interfering with the operation of the vehicle and, in addition, providing mechanical advantages useful in dumping the vehicle.

Another object of the invention is to provide, in a vehicle construction, a high-angle low-bed dump truck of simple construction and easy operation.

The foregoing objects, and others ancillary thereto, I prefer to accomplish as follows:

According to a preferred embodiment of my invention, I provide a main vehicle frame, having the usual wheels and engine on the forward end, but having no ground-engaging means directly connected to its rear portion. Upon said main frame at the rear thereof I mount in superposition and pivotally connect a tilting frame which lies upon the main frame and which may have any of the several types of racks or bodies customary in the trucking business. This tilting frame is hingedly connected to the main frame at the rear thereof, and means is provided between the main and tilting frames whereby the latter may be raised to a dumping position with respect to the former.

In one form of construction, leaf springs of conventional type are operatively connected to the tilting frame and to an axle housing below. The usual gears and axle in the housing have operative connection with a propeller shaft which extends forwardly to the engine and receives rotary power therefrom, whereby ground-engaging means connected to the axle are revolved and motion is imparted to the vehicle. In this preferable form of the invention, the springs supporting the tilting frame are pivotally connected to the axle housing therebelow so that the tilting frame may be hingedly moved at its pivotal connection with the main frame and revolve in connection with its axle housing without the latter being revolved. Torque resisting means is coupled to the axle housing and extends forwardly to the main frame so that during such tilting operation no unnatural twist is applied to the axle housing or its connections with the propeller shaft.

In other forms of the invention, the tilting frame is mounted on the rear of a self-powered tractor, and in this case, has no drive axle assembly, thus permitting the elimination of the torque resisting means and hinge coupling between the axle and springs.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a fragmentary side elevational view, with parts in cross section, of a tiltable vehicle construction according to the present invention;

Fig. 2 is a fragmentary cross-sectional view, with parts in elevation and parts in section, taken through the frame and axle housing of the vehicle in a plane between the gear case and the spring connection to the axle;

Fig. 3 is an enlarged detail view of torque resisting means employed in connection with the axle housing;

Fig. 4 is a fragmentary cross-sectional view, with parts in elevation, similar to Fig. 2, taken on line 4—4 of Fig. 5;

Fig. 5 is a vertical cross-sectional view, taken on line 5—5 of Fig. 4, with parts shown in elevation; and Fig. 6 is a fragmentary side elevational view similar to Fig. 1, but showing a modified form of tilting bed vehicle construction.

A preferred embodiment of my invention, referring to Figures 1 through 5 of the drawings, is constituted by a vehicle main frame with which is associated a tilting frame which is provided with ground-engaging means serving, through connections between the tilting and main frame, to support the latter, which does not have any individual ground-engaging support means of its own. The numeral 10 designates the main frame of such a vehicle, which has forward wheels 12 and engine (not shown) and the usual cab 14 over the engine and front wheels. The frame 10 has rearwardly directed terminal horns 16. Extending rearwardly from the engine, positioned in the forward part of the main frame, is a telescoping propeller shaft 20.

Superposed upon the main frame 10 is a tilting frame 19 which is pivotally connected to horns 16 of the main frame by pivot pins 24 passing through arms 17, depending from frame 19.

Laterally of the main and tilting frames, and below the latter beyond the rear end of the main frame, is located an axle housing 26 which encloses the axle 28 of wheels 29, and is provided at approximately the mid-point with the usual gear casing 25, to which is attached the rear end of the telescoping propeller shaft 20. The propeller shaft comprises tubular member 21, which receives the splined member 22 in a telescoping manner, and the usual universal joint 23 is provided at the rear of member 22 at the point where it is connected with the usual shaft 24 protruding from the gear case 26.

As can be clearly seen in Fig. 5, the outboard end of axle housing 26 is provided with bearing surfaces 32, around which are disposed the bearing halves 34 and 36 which are securely clamped in position by U-bolts 38, which also clamp the leaves of the supporting springs 40 that resiliently support the tilting frame at its rear. Grooves with the bearing halves mate with the annular rib 35 to restrain lateral movement of the bearing or axle housing relative each other. Shackles 40', 40'', between the spring ends and the tilting frame 22 are used in a conventional manner.

With the pivotal connection thus described, it can be seen that the spring assembly and the tilting frame 19 can be swung axially about the housing 26 without rotation of the latter.

In Figs. 2 and 3 I show torque resisting means between the axle housing 26 and the main frame horn 16. This torque resisting assembly comprises a tubular arm 45 having fork arms 41 and 42, each of which is coupled by a ball-and-socket 43 and 44 to opposite sides of housing 26. Inserted in the tubular member 45 is the bar 47, which is pivotally connected at 48 to the main frame.

As the tilting frame is moved into the dotted line position shown in Fig. 1, there is no twisting or rotation of the axle housing or the application of any torque to the universal joint 23 or to the propeller shaft 20.

I have shown in the drawings a supplemental frame 50 mounted upon the tilting frame 19, and it will be understood that this can form the bed of any suitable type of truck body that is desired whether it be a dump body or a rack truck of the more conventional style.

When the tilting frame 19 is resting upon the main frame 10, it is retained against lateral or twisting motion by the pivotal connections 24 between the two frames and, as well, by the side plates 25 which engage the forward end of frame member 19 and restrain twisting of the same.

Pivotally mounted on pins 52 is hydraulic cylinder 54, in which moves the piston rod 56 which is connected at 58 to the frame 19. When hydraulic or pneumatic power is applied to cylinder 54 to extrude the rod 56 therefrom, the tilting frame will be swung to the dotted line position relative the main frame, as appears in Fig. 1.

In Fig. 6 I disclose a modification of my invention in which supplemental tilting frame 61 replaces bed-frame 50 and is hingedly secured at 62 to tilting frame 19. Between the frames 19 and 61 is the arm or link 64 connected at 65 to frame 19, and at 65' to frame 61, with a lost-motion connection. Intermediate the ends of link 65 is connected the piston rod 66, operating as above described, to lift first the frame 19 and then the frame 61.

It will also be noted that in Fig. 6 a further modification is illustrated in that main frame 60 is supported by wheels 67, axle 68 and springs 69. Wheels 67 are powered in the usual manner by propeller shaft 70. In this arrangement, tilting of the frame 19 relative frame 60 need not be accompanied by independent movement relative the axle of wheels 71 which support frame 19.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A vehicle construction, comprising: a main frame having ground-engaging means on the forward end; a tilting frame superposed upon and hinged to the rear of said main frame; a housed axle and ground-engaging members to be driven positioned below said tilting frame; means pivotally coupled to said axle housing and associated with said tilting frame in supporting relation; means between said main frame and said tilting frame for raising the latter and swinging it about its hinged connection with said main frame; and torque resisting means coupled between said axle housing and said main frame to prevent rotation of said axle housing.

2. A vehicle construction, comprising: a main frame having ground-engaging means on the forward end; a tilting frame superposed upon and hinged to the rear of said main frame; a housed axle and ground-engaging members to be rotated positioned below said tilting frame; spring means pivotally coupled to said axle housing and associated with said tilting frame in flexible supporting relation; means between said main frame and said tilting frame for raising the latter and swinging it about its hinged connection with said main frame; and torque resisting means coupled between said axle housing and said main frame to prevent rotation of said axle housing.

3. An automotive dump vehicle, comprising: a main frame, a tilting frame pivotally connected between its ends to said main frame so that a portion thereof overlies a portion of said main frame, front ground-engaging means for supporting the forward portion of said main frame, rear ground-engaging means including an axle adapted to be driven and a housing therefor, the axle housing of said rear ground-engaging means being positioned under said tilting frame adjacent its pivotal connection to said main frame and being pivotally coupled to said tilting frame, a horn on said axle housing, and a contractible torque arresting link connected between said horn and the main frame.

KENNETH E. COOK.

REFERENCES CITED

The following references are of record in the file of this patent:

UNITED STATES PATENTS

| Number | Name | Date |
| --- | --- | --- |
| 1,165,067 | Brush | Dec. 21, 1915 |
| 1,538,052 | Mueller | May 19, 1925 |
| 2,027,098 | Helms | Jan. 7, 1936 |

FOREIGN PATENTS

| Number | Country | Date |
| --- | --- | --- |
| 1,119 | Great Britain | Jan. 17, 1901 |